Oct. 27, 1925.

M. P. HOLMES 1,558,675

CONTROLLING MECHANISM

Filed June 11, 1921

Inventor:
Morris P. Holmes.
by
Horace L. Roche
Atty.

Patented Oct. 27, 1925.

1,558,675

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

CONTROLLING MECHANISM.

Application filed June 11, 1921. Serial No. 476,903.

*To all whom it may concern:*

Be it known that I, MORRIS P. HOLMES, a citizen of the United States, residing at Claremont, in the county of Sullivan and State of New Hampshire, have invented certain new and useful Improvements in Controlling Mechanism, of which the following is a full, clear, and exact specification.

This invention relates to mechanical power transmitting connections, and especially, although not exclusively, to the connections employed in a mining machine of a certain type between the lever for operating the friction clutch, which controls the feeding mechanism of the machine, and the manually operated shaft for actuating said lever.

The invention has for its object to provide an improved connection of the character described in which lost motion incidental to wear of the parts will be reduced to a minimum, and in which said parts can be conveniently and efficiently lubricated.

The foregoing and other objects of the invention, together with means whereby the same may be carried into effect, will best be understood from the following description of one form and application thereof illustrated in the accompanying drawings, in which,—

Figures 1, 2, 3:
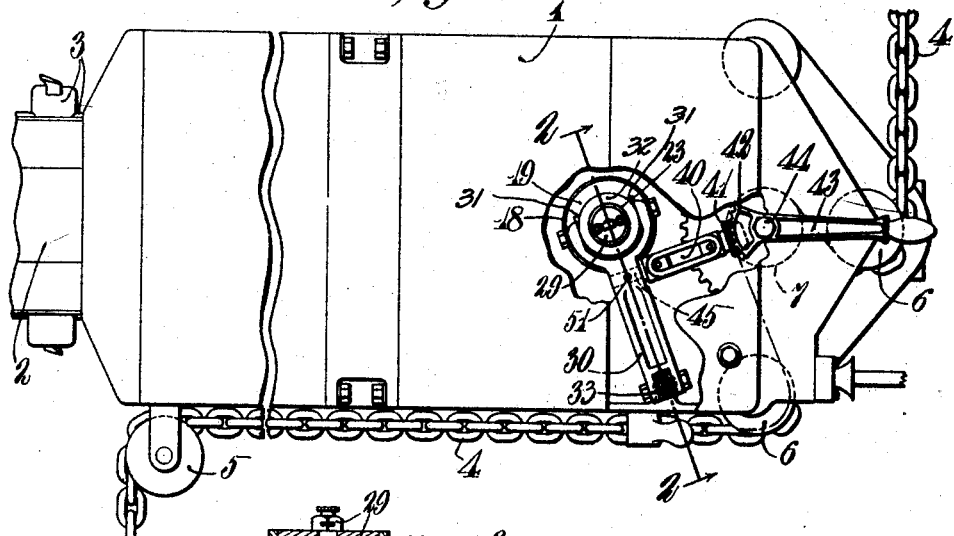
Fig. 1 is a plan view, partly broken away, of a mining machine equipped with my improvement.
Fig. 2 is an enlarged vertical section taken substantially on the line 2—2 of Fig. 1.
Fig. 3 is a detail section taken substantially on the line 3—3 of Fig. 2.

In Fig. 1 is illustrated a mining machine of a standard type including a bed-like frame 1 carrying a cutter bar 2 which is provided with a cutter chain 3, the machine being adapted to be fed along the face of the mine by means of a feed chain 4, connected at its ends to suitable supports in front of the face, and moving about suitable guiding members 5 and 6 at the front and rear of the machine, the latter being fed along the chain by a suitable driving member 7 which, in turn, is driven in a well-known manner from a motor (not shown) through a suitable train of gearing including a pinion 11 (Fig. 2) and a shaft 16 on which said pinion is carried.

The parts referred to all are, or may be, substantially similar to the corresponding parts shown and described in Letters Patent No. 1,347,811, granted to me July 27, 1920, to which reference may be had for a more complete disclosure of mechanism not fully shown herein.

In order to control the connection of the feed chain driving member 7 with the motor, a friction clutch is usually provided. In the construction shown, this clutch controls the connection of the gear 11 to the shaft 16. As illustrated, the gear 11 is preferably provided at its upper end with an integral cup 18 having a cover 19 for sealing it against the entry of dust or the like and an inner lining ring 20. The lining ring 20 is engaged by a series of inner segmental friction members 21 which are forced into engagement with said lining ring by means of toggle members 22 pivoted at their outer ends to said friction members and at their inner ends to a reciprocable, centrally located controlling member 23. The friction members 21 are engaged by radially disposed arms 24 on a spider 25 keyed to the shaft 16, whereby the rotation of said shaft is transmitted to said friction members and from the latter, when in engagement with the lining ring 20, to the cup 18 and gear 11. The controlling member 23 is normally forced downwardly to cause the friction members 21 to engage the lining ring 20 with a predetermined pressure by means of a spring 26 interposed between a washer 27 seated on an interior shoulder in said member and a nut 28 on the threaded upper end of the shaft 16, said nut being adjustable to control the tension of said spring. Suitable sealing means 29 may, if desired, be provided in order to prevent access to the nut 28 by unauthorized persons, said sealing means, however, forming no portion of the present invention, and being well-known in the art. For lifting the controlling member 23 against the tension of the spring 26 to release the friction clutch, there is provided a lever 30 having a bifurcated end carrying rollers 31 cooperating with a flange 32 on said controlling member, said lever having a preferably adjustable fulcrum 33, and being operated by a shaft 39 journaled in a suitable bracket 40 secured to the machine frame 1. Said shaft carries at its rear end a bevel gear 41 meshing with a suitable arcuate rack 42 formed on the forward end of an operating lever 43 which is pivoted at 44 on the upper part of the frame.

Except as hereafter pointed out, the lever 30, adjustable fulcrum 33, operating shaft 39, and levers 43 all are, or may be, substantially similar to the corresponding parts more fully shown and described in Letters Patent No. 1,347,811, above referred to. In the construction illustrated in said patent, however, the lever 30 and shaft 39 are operatively connected by means of a crank pin or eccentric formed on the end of said shaft and engaging a longitudinal slot in said lever. It is found in practice that such a connection is difficult to lubricate, and that, by reason of wear, lost motion develops, which makes it difficult to control the friction clutch and feed driving member with the accuracy required in this type of machines. In order to overcome this difficulty, and in accordance with the present invention, the following construction is provided.

The shaft 39 is provided at its end opposite the gear 41 with a crank pin or eccentric 45 (see also Fig. 3) which is received in a recess 46 formed in the lever 30 and is operatively connected with said lever by a link 47 also located in said recess, said link comprising an eccentric strap portion 48 surrounding the crank pin or eccentric 45, and having a cylindrical head 49 which is received in a cylindrical socket 50 formed in the lever 30 and communicating with the recess 46. In this construction it will be observed that the wear, instead of coming solely upon the sides of the slot engaging crank pin, and tending to flatten the same, is distributed over substantially the entire surfaces of the pin 45, eccentric strap 48, head 49, and socket 50, so as not materially to affect the proper engagement of said parts. It will also be observed that the surfaces in question may be readily lubricated, and are of such a character as to retain sufficient lubricant to prevent objectionable wear and to insure easy operation. In order to facilitate the lubrication of the parts, however, the lever 30 is provided at its top with a lubricant receiving opening 51 communicating with the socket 50, while the head 49 is provided with a notch 52 adjacent said opening 51 and with lubricant conducting grooves 53 leading from said notch, whereby the lubricant is distributed over the inner wall of said socket, from which said lubricant finds its way into the recess 46 and thence to the eccentric strap 48 and crank pin 45.

While I have herein shown and described in detail one form which my invention may assume in practice and one use to which it may be put, it will be understood that the particular construction and adaptation described and shown have been chosen for illustrative purposes merely, and that the invention may be otherwise embodied and used without departing from its spirit or the scope of the claims hereunto appended.

What I claim as new and desire to secure by Letters Patent is:—

1. The combination with a clutch, of a crank pin movable to operate said clutch, a clutch actuating member cooperating therewith and provided with a recess and a socket, and a link disposed in said recess connecting said pin and member and having a head seated in said socket.

2. The combination with a clutch, of an eccentric movable to operate said clutch, a clutch actuating member cooperating therewith and provided with a recess and a socket, and an eccentric strap disposed in said recess for said eccentric having a head received in said socket.

3. The combination with a clutch, of a crank pin movable to operate said clutch, a clutch actuating member cooperating therewith and provided with a recess and a cylindrical socket, and a link disposed in said recess connecting said pin and member and having a cylindrical head received in said socket.

4. The combination with a clutch, of a crank pin movable to operate said clutch, a clutch actuating member cooperating therewith and provided with a socket, and a link connecting said pin and member and having a head received in said socket, said head and socket having cooperating lubricant distributing means.

5. The combination with a clutch, of a crank pin movable to operate said clutch, a clutch actuating member cooperating therewith and provided with a cylindrical socket, and a link connecting said pin and member and having a cylindrical head received in said socket, said head and socket having cooperating lubricant distributing means.

6. The combination with a clutch, of a crank pin movable to operate said clutch, a clutch actuating member cooperating therewith and provided with a socket and with a lubricant receiving opening communicating with said socket, and a link connecting said pin and member and having a head received in said socket, said head being provided with a notch adjacent said lubricant receiving opening and with grooves leading from said notch.

7. The combination with a crank pin, of a member cooperating therewith provided with a recess to receive said crank pin and with a socket communicating with said recess, and a link in said recess for operatively connecting said crank pin and member, said link having a head received in said socket.

8. The combination with a crank pin and a member cooperating therewith provided with a recess to receive said crank pin and with a cylindrical socket communicating with said recess, of a link in said recess for operatively connecting said crank pin and member, said link having a cylindrical head received in said socket.

9. The combination with a crank pin and a member cooperating therewith provided with a recess to receive said crank pin and with a socket communicating with said recess, of a link in said recess for operatively connecting said crank pin and member, said link having a head received in said socket, and said head and socket having cooperating lubricant distributing means.

10. In a mining machine, in combination, a friction device, a lever for operating said friction device, a crank pin for operating said lever, and a link disposed within the limits of said lever connecting said lever and crank pin.

11. In a mining machine, in combination, a friction device, a pivoted lever for operating said friction device, said lever being provided with a socket and a communicating recess disposed between the friction device and the pivot, a crank pin for operating said lever projecting into said recess, and a link connecting said crank pin and lever and having a head received in said socket.

12. In a mining machine, in combination, a friction device, a pivoted lever having a portion thereon for operating said friction device, said lever having a cylindrical socket and a communicating recess disposed between the operating portion and the pivot, a crank pin for operating said lever projecting into said recess, and a link connecting said crank pin and lever and having a cylindrical head received in said socket.

13. In a mining machine, in combination, a friction device, a pivoted lever for operating said friction device, said lever being provided with a recess and a socket between the friction device and the pivot, a crank pin for operating said lever, and a link disposed in said recess connecting said crank pin and lever and having a head received in said socket.

14. In a mining machine, in combination, a friction device, a pivoted lever having a portion thereon for operating said friction device, said lever having a recess and a cylindrical socket disposed between the operating portion and the pivot, a crank pin for operating said lever, and a link disposed in said recess connecting said crank pin and lever and having a cylindrical head received in said socket.

15. In a mining machine, in combination, a friction device, a lever for operating said friction device, a crank pin for operating said lever, said lever having a recess to receive said crank pin and a socket communicating with said recess, and a link in said recess operatively connecting said crank pin and lever, said link having a head received in said socket.

16. In a mining machine, in combination, a friction device, a lever for operating said friction device, a crank pin for operating said lever, said lever having a recess to receive said crank pin and a cylindrical socket communicating with said recess, and a link in said recess for operatively connecting said crank pin and lever, said link having a cylindrical head received in said socket.

17. In a mining machine, in combination, a friction device, a lever for operating said friction device, a crank pin for operating said lever, said lever having a recess to receive said crank pin and a cylindrical socket communicating with said recess, and a link in said recess for operatively connecting said crank pin and lever, said link having a cylindrical head received in said socket, and said head and socket having cooperating lubricant distributing means.

18. In a mining machine, the combination of a friction device having a longitudinally movable element, a pivoted lever for operating said friction device, means including a link having its lateral limits disposed within the lateral limits of said lever operatively connected to said lever at a point between its ends for moving the same about its pivot, a bifurcated end portion carried on said lever at the opposite side of said means from the lever pivot and carrying a plurality of rollers on opposite sides of said longitudinally moving element, and means carried on said element and including a flange, engaged by said rollers.

19. In a mining machine, a drive member, a driven member, and means for connecting said driven member to said drive member including an operating member, a lever having a recess and a socket therein, and a link disposed in said recess having a portion disposed in said socket and cooperating with said operating member.

20. In a mining machine, a drive member, a driven member, and means for connecting said driven member to said drive member including an operating member, a lever having a recess therein, and a pivoted link disposed in said recess connecting said operating member to said lever.

21. In a mining machine, a drive member, a driven member, and means for connecting said driven member to said drive member including an operating member including an eccentric, a lever having a recess therein, and a pivoted link disposed in said recess connecting said operating member to said lever.

22. In a mining machine, a drive member, a driven member, and means for connecting said driven member to said drive member including an operating member having an eccentric, a pivoted lever having a recess therein, and a pivoted link disposed in said recess and cooperating with said eccentric for connecting said operating member to said lever.

In testimony whereof I affix my signature.

MORRIS P. HOLMES.